United States Patent [19]

Reichelt et al.

[11] 4,095,869
[45] Jun. 20, 1978

[54] APPARATUS FOR TUNING NARROW BAND WAVE GUIDE REFLECTORS

[75] Inventors: Achim Reichelt; Gerhard Winzer, both of Munich, Germany

[73] Assignee: Siemens Aktiengesellschaft, Berlin & Munich, Germany

[21] Appl. No.: 707,644

[22] Filed: Jul. 22, 1976

[30] Foreign Application Priority Data

Sep. 29, 1975 Germany .............................. 2543469

[51] Int. Cl.² .............................................. G02B 5/14
[52] U.S. Cl. ................................................ 350/96.14
[58] Field of Search ...................... 350/96 WG, 96 C; 331/94.5 C

[56] References Cited

U.S. PATENT DOCUMENTS 3,868,589   2/1975   Wang ........................... 350/96 WG
3,884,549   5/1975   Wang et al. .................. 350/96 WG
3,906,393   9/1975   Fletcher et al. .............. 350/96 WG Primary Examiner—John K. Corbin
Assistant Examiner—Stewart Levy
Attorney, Agent, or Firm—Hill, Gross, Simpson, Van Santen, Steadman, Chiara & Simpson

[57] ABSTRACT

Narrow band wave guide reflectors arranged on a substrate and having wave guide layers with periodic perturbations are tuned by adapting the effective index of refraction $n_{eff}$ of the wave guide layer to fulfill the Bragg condition of reflection. The index of refraction is adapted by either varying the thickness of the wave guide layer continuously over a width of the layer or by applying a field to a substrate or superstrate comprised of magneto- or electro-optical material to change the index of refraction of the substrate or superstrate.

5 Claims, 6 Drawing Figures

APPARATUS FOR TUNING NARROW BAND WAVE GUIDE REFLECTORS

BACKGROUND OF THE INVENTION

1. Field of the Invention

The present invention relates to a method and apparatus for tuning narrow band wave guide reflectors arranged on a substrate and wherein wave guide layers are provided having periodic perturbations or their direct optical equivalent.

2. Description of the Prior Art

Reflectors for wave guide optical layers cannot be achieved by use of conventional construction techniques with dielectric layer systems. Only in special cases when geometrically thick wave guides are used is it possible to insert dielectric end mirrors or reflectors into the light path of the wave guide at a later time with the aid of a hybrid technique. Such technology is very expensive, however.

Alternatively, there is the possibility of using distributed feedback coupling (DFB) and distributed Bragg reflection (DBR) by way of periodic perturbations of the wave guide in the light expansion direction. The periodic perturbation is a localized variation of the effective index of refraction $$n_{eff} = \beta/k = c/v$$

for the mode considered, i.e. for the relation of light speed in a vacuum to that of light speed of this mode in the wave guide. The effective index of refraction $n_{eff}$ is linked at the reflector with a grating constant $g$ related to the periodic perturbation by way of the Bragg condition $$g = \lambda/2\, n_{eff}$$

Such small grating constants, however, can at the present time only be produced holographically in the wave guide for the optical wavelength range. The grating constant may be produced directly as a period thickness variation of a photo lacquer superstrate or with the aid of successive photolithographic method techniques such as etching processes, evaporation technique, diffusion and implantation.

With the above techniques, however, it is difficult to precisely maintain the necessary tolerances for the grating constant $g$.

SUMMARY OF THE INVENTION

It is an object of the present invention to provide a method and apparatus for tuning narrow band wave guide reflectors.

According to the invention, the Bragg condition for the reflection is fulfilled by way of adapting the effective index of refraction $n_{eff}$ of the wave guide layer either by changing the thickness of the wave guide or by an electro-optical or magneto-optical change of the index of refraction of the substrate or superstrate.

The invention follows from recognition that a given wavelength $\lambda$ results when the effective index of refraction $n_{eff}$ is changed in the equation $g \cdot n_{eff} = \lambda/2$.

A preferred arrangement for the invention consists in using a substrate and a wave guide strip with periodic perturbation applied theron wherein the wave guide strip has a thickness changing continuously over the width of the strip.

In another preferred embodiment of the invention, the substrate consists of an electro-optical material wherein the wave guide is a wave guide channel arranged in the substrate and wherein electrodes extend parallel to the channel on the substrate.

In another embodiment of the invention, a superstrate consisting of a liquid crystal is provided upon the wave guide such that a liquid crystal layer is arranged between electrodes.

In another embodiment of the invention, a tunable wave guide reflector consists of a substrate, a first electrode applied upon the substrate, a crystal made of electro-optical material with a wave guide channel and periodic perturbations therein arranged over the first electrode and substrate, an intermediate layer applied on the crystal having an electrode pair extending parallel to and both sides of the wave guide channel, a liquid crystal layer applied over the intermediate layer, and a second electrode and covering plate over the liquid crystal layer.

DESCRIPTION OF THE PREFERRED EMBODIMENTS

Figure 1:
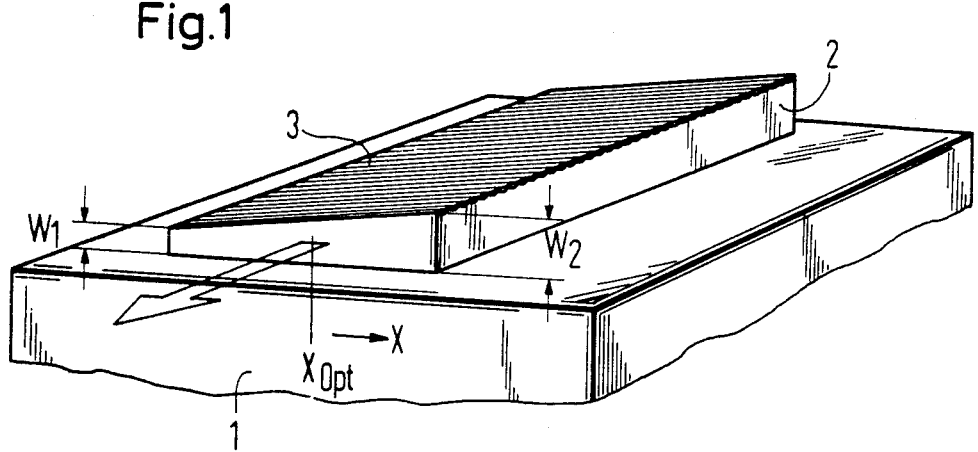
FIG. 1 is a perspective view of a wedge-shaped wave guide strip.

The thickness change of a wave guide as shown in FIG. 1 is particularly suited for a one-time tuning to a wave-length $\lambda$. In FIG. 1, 1 is a substrate with the index of refraction $n_1$, 2 is a wedge-shaped wave guide strip with periodic interference, for instance a holograph grating. The wave guide strip 2 has an index of refraction $n_2$, and its thickness changes continuously over the width of the wave guide strip. Thus, there is a location $x_{opt}$ for which the Bragg condition is optimally fulfilled in the case of suitable light coupling. The expansion direction of the guided waves is indicated by the double arrow. The smallest thickness of the wedge is denoted by $W_1$ and the largest thickness with $W_2$.

In the case of the arrangement shown in FIG. 1 a change will be obtained for the effective index of refraction $\Delta_{eff} = 0.040 = 2.5\%$ with the following date: $n_1 = 1.53$, $n_2 = 1.68$, $W_1 = 0.4\ \mu m$ and $W_2 = 0.6\ \mu m$, corresponding to $(\beta/k)_1 = 1.588$ and $(\beta/k)_2 = 1.628$ for the $TM_0$ mode. For a realized grating constant $g = 0.3000\ \mu m$, a correction $\Delta g = g \cdot |\Delta n_{eff}| / n_{eff} = 0.0076\ \mu m$ is thus possible.

Figure 2:
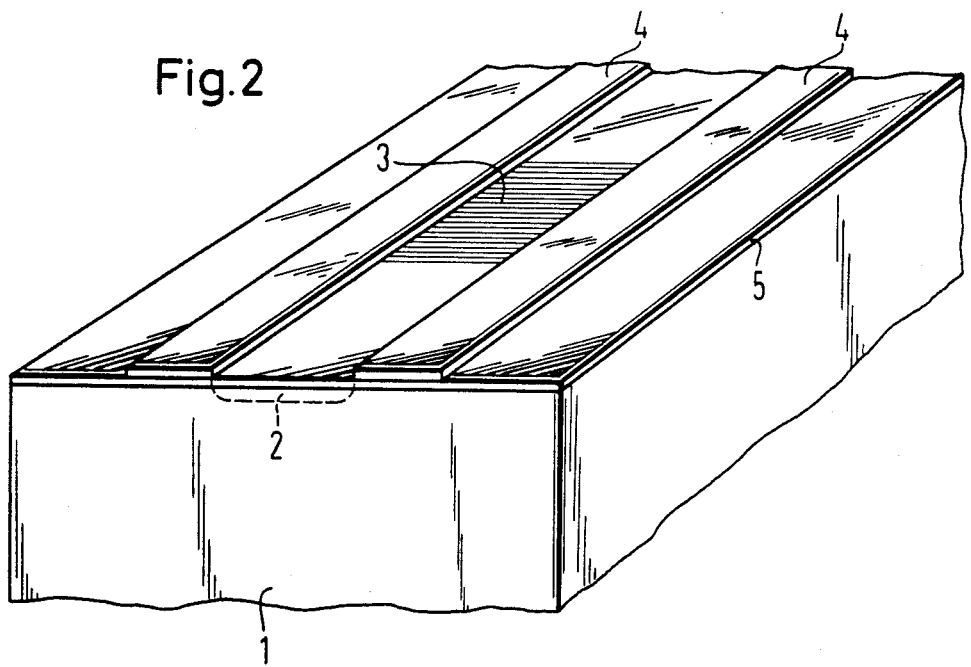
FIG. 2 is a perspective view of a wave guide reflector tuned by use of an electro-optical crystal.

An arrangement is shown in FIG. 2 whereby the tuning to the wavelength $\lambda$ is effected by way of an electro-optically induced change of the index of refraction. There 1 is again a substrate which, in this case, consists of electro-optical material such as lithium niobate with an index of refraction $n_1$, whereby a wave guide channel 2 with the index of refraction $n_2$ is arranged in the substrate 1. The wave conductive channel 2, may, for instance be produced within the electro-optical material by way of diffusion titanium into lithium niobate or by a diffusion out of niobium, or by way of other prior-art methods. Reference numeral 3 is the periodic perturbation in or upon the wave conductor 2, 4 denotes two electrodes extending parallel to the channel, and 5 denotes a dielectric intermediate layer with the index of refraction $n_5 < n_2$. The change of the index of refraction $n_{eff}$ for tuning purposes is caused via the electric field between the electrode strips 4. This, however, only permits small corrections for adapting the grating constant g, as is shown in the following example. If it is assumed that $\lambda = 1.06$ μm (YAG-laser wavelength), $n_{eff} = 1.8$ and corresponding to the Bragg condition, $g = 294.4$ nm, and an electro-optically induced change of the index of refraction of $\Delta n_{eff} \approx 10^{-3}$ is assumed, then only a $\Delta g = g \cdot |\Delta n_{eff}|/n_{eff} \approx 0.16$ nm will result. This value corresponds to twice to three times the half-value width of the experimentally realizable wavelength dependent reflection characteristic.

Figure 3:
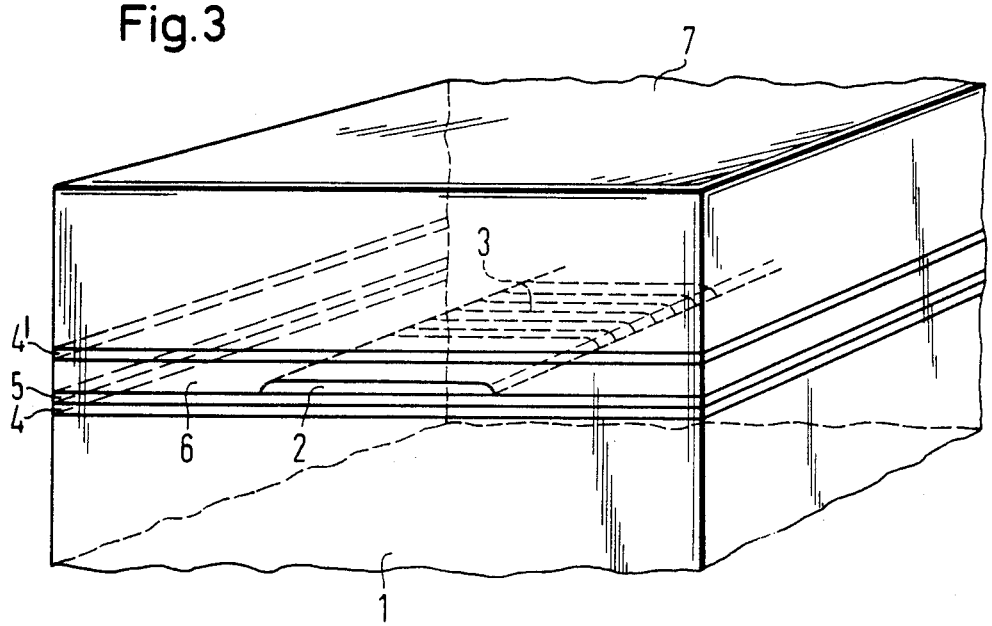
FIG. 3 is a perspective view of a wave guide reflector tuned with a liquid crystal.

Stronger changes of $\Delta n_{eff}$ in the order of magnitude of $10^{-1}$ may be obtained with the help of liquid crystals, whereby, correspondingly, a change of $\Delta g$ will occur which is larger with respect to the example shown in FIG. 2, by the factor $10^2$. In FIG. 3, the design of a wave guide with periodic perturbations is shown in connection with an electro-optically controllable liquid crystal as a superstrate in one of the alternate embodiments of this invention. There, the substrate is again denoted as 1, the wave conductor as 2, the period interference in or upon the wave conductor as 3, and two electrodes 4, 4'. A dielectric intermediate layer 5 is applied onto the electrode 4. A liquid crystal layer 6 is positioned as a superstrate upon the intermediate layer 5 and the electrode 4' on the layer 6, and, a covering plate 7 is provided thereupon. The optical properties of liquid crystals follow the changes of the electric field strength relatively slowly, such as in an order of magnitude of a few msec, while the electro-optical crystals such as lithium niobate and others follow changes of the electric field strength comparatively fast, i.e. in an order of amgnitude of picoseconds.

Figure 4:
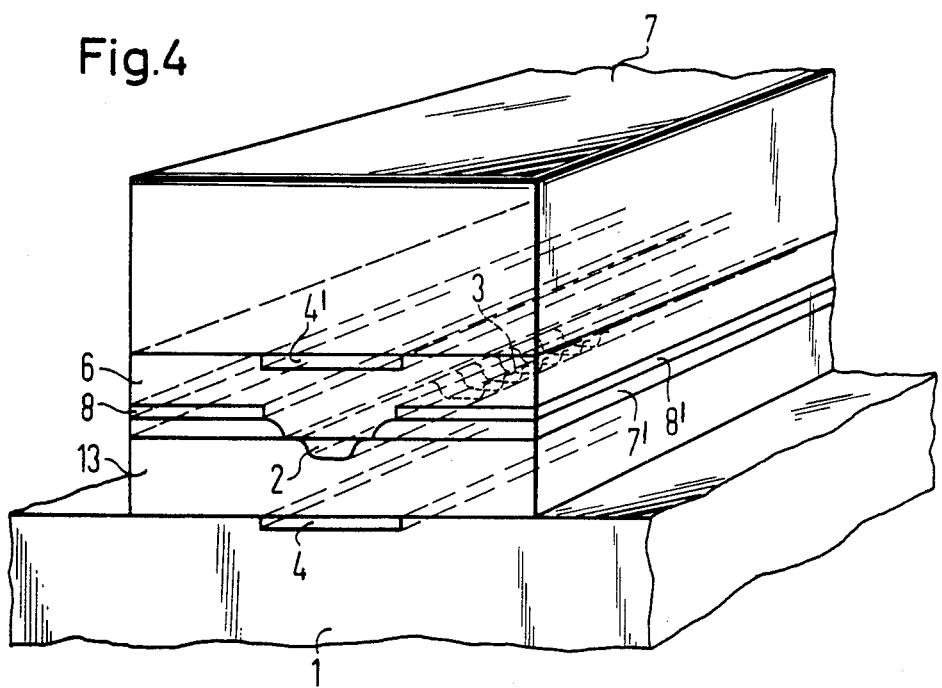
FIG. 4 is a perspective view of a wave guide reflector arrangement having both quasi-static and fine tuning.

If the arrangements shown in FIGS. 2 and 3 are combined in a suitable manner, as illustrated in one of the possible embodiments in FIG. 4, then a quasi-static adaptation to a wide range of wavelength can be effected via the liquid crystal. Via the electro-optical crystal in the wave guide, the reflector arrangement may, in addition, be finely tuned in an extremely fast manner. The directions of the electric field strength of both control fields and the crystal axes are thereby positioned in such a way that the two electro-optical effects remain as independent from one another as possible. In the sample embodiment shown in FIG. 4, a substrate is again denoted by 1, an electrode pair by 4,4', a crystal made of electro-optical material by 13, a wave guide channel in the crystal by 2, the periodic perturbation in or on the wave guide by 3, a liquid crystal layer by 6, a dielectric intermediate layer by 5, a second electrode pair by 8,8', and a covering plate by 7.

Figure 5:
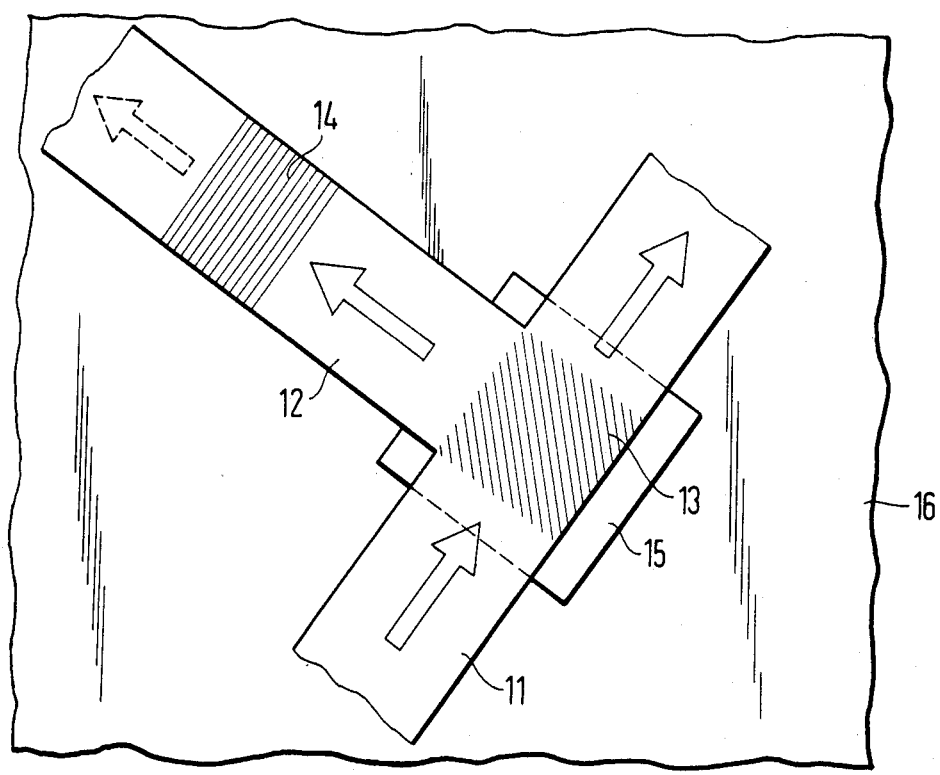
FIG. 5 is a plan view of a wave guide modulator.

The arrangements in accordance with this invention may advantageously be used with integrated optical filters, modulators and wave guide lasers. In FIG. 5, the application of a tunable reflector for modulation has been shown. There, a wave guide for arriving waves has been denoted by 11, a wave guide for narrow band reflected waves by 12, a tunable filter grating by 13, an analyzer grating by 14, an electro-optical crystal by 15, and a carrier by 16. The wave guided in the wave guide 11 is reflected within a narrow band by the tunable reflection filter 13 in the wave conductor 12 and will there encounter the wavelength analyzer 14. This analyzer may either be a rigid, narrow band reflector or a quasi-static or dynamically tunable narrow band reflector. The amplitude of the waves guided in the wave guide 12 behind the analyzer depends on the degree of adaptation of both reflectors 14, 13. When one of the two reflectors can be quickly tuned, then the arrangement is a wave guide modulator.

Figure 6:
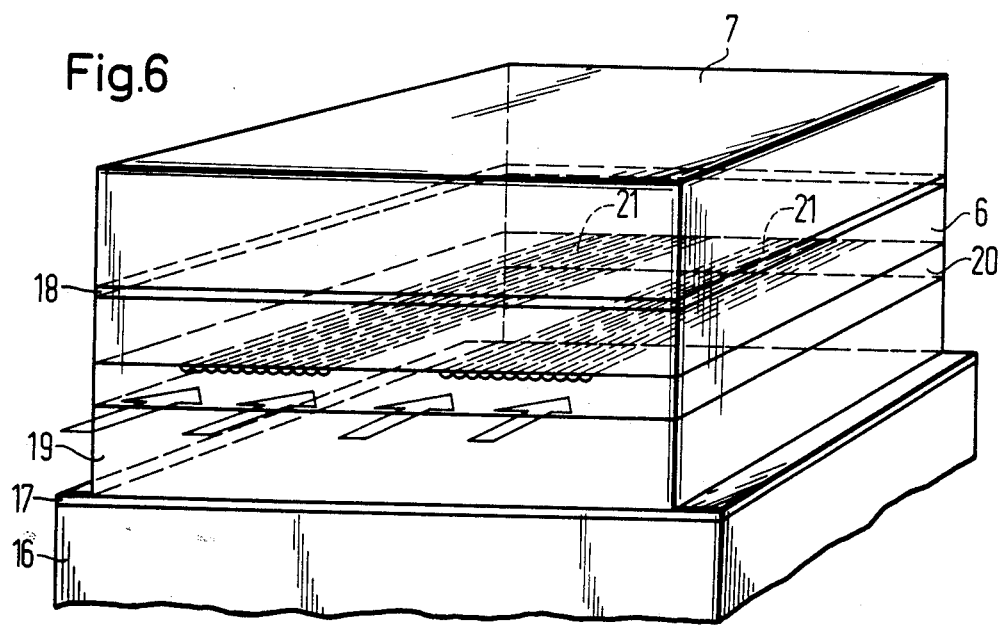
FIG. 6 is a perspective view of a wave guide laser having tunable structures.

Finally, FIG. 6 shows an electro-optically controllable wave guide laser in which, as an example, a liquid crystal 6 is again applied as a superstrate above the DFB or DBR structure 21. By way of electro-optical tuning, it results that the laser changes its mode characteristic with time, shows a Q switching behavior or can be analyzed. 16 is a carrier, 17, 18 are an electrode pair, 19 is a substrate for the wave guide laser, 20 is the wave guide laser itself, and 7 a covering plate, while the four double arrows show the direction of the incident pumping light.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. An apparatus for tuning narrow band wave guide reflectors comprising:
   a. a substrate;
   b. a wave guide reflector layer arranged on the substrate having periodic perturbations; and
   c. means for adpating the effective index of refraction $n_{eff}$ of the wave guide reflector layer to fulfill the Bragg condition of the reflection comprising providing said wave guide reflector layer with a thickness which changes continuously over the width of the layer.

2. The apparatus of claim 1 further including a superstrate comprising a liquid crystal layer provided upon the wave guide layer and that the liquid crystal layer is arranged between electrodes.

3. The apparatus of claim 1 in which a first electrode is arranged on the substrate, a crystal made of electro-optical material having a wave guide reflector channel with periodic interferences arranged herein, an intermediate layer on said crystal having electrodes extending parallel to and on both sides of the channel, a liquid crystal layer over said intermediate layer, a second electrode over said liquid crystal layer, and a covering plate over said second electrode.

4. The apparatus of claim 1 in which said means for adapting the effective index of refraction also comprises a layer adjacent to said wave guide layer having an index of refraction which can be varied by application of a field thereto.

5. The apparatus of claim 4 in which the substrate comprises electro-optical material, that the wave guide layer is a wave guide channel arranged in the substrate, and that electrodes are arranged adjacent the channel.

* * * * *